(12) United States Patent
Bernhardt et al.

(10) Patent No.: US 11,783,697 B2
(45) Date of Patent: Oct. 10, 2023

(54) METHOD, APPARATUS, AND SYSTEM FOR ENSURING PRIVACY WHILE MAINTAINING FLOATING CAR DATA ACCURACY

(71) Applicant: HERE GLOBAL B.V., Eindhoven (NL)

(72) Inventors: Bruce Bernhardt, Chicago, IL (US); Jingwei Xu, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 656 days.

(21) Appl. No.: 16/440,652

(22) Filed: Jun. 13, 2019

(65) Prior Publication Data
US 2020/0394905 A1    Dec. 17, 2020

(51) Int. Cl.
*G08G 1/01*  (2006.01)
*G08G 1/017*  (2006.01)
(Continued)

(52) U.S. Cl.
CPC .......... *G08G 1/0112* (2013.01); *G08G 1/017* (2013.01); *H04L 63/0414* (2013.01); *H04L 63/0876* (2013.01); *H04W 4/44* (2018.02)

(58) Field of Classification Search
CPC ....... G08G 1/0112; G08G 1/017; H04W 4/44; H04L 63/0414; H04L 63/0876
See application file for complete search history.

(56) References Cited

U.S. PATENT DOCUMENTS

2016/0097648 A1* 4/2016 Hannah .............. G08G 1/0116
                                                        701/118
2019/0026492 A1* 1/2019 Sandholm ............ H04L 9/0643
(Continued)

FOREIGN PATENT DOCUMENTS

CN    107396285 A    11/2017
CN    107682149 A     2/2018

OTHER PUBLICATIONS

Rass et al., "How to Protect Privacy in Floating Car Data Systems", Proceedings of the Fifth International Workshop on Vehicular Ad Hoc Networks, Jan. 2008, 7 pages.
(Continued)

*Primary Examiner* — Ig T An
*Assistant Examiner* — Stephanie T Su
(74) *Attorney, Agent, or Firm* — DITTHAVONG, STEINER & MLOTKOWSKI

(57) ABSTRACT

An approach is provided for providing probe data accuracy while ensuring privacy. The approach includes receiving probe path consisting of multiple points from a vehicle, wherein each probe point includes a location of the vehicle and a timestamp indicating when the location was determined by a location sensor. The approach further includes determining a vehicle identifier from among a plurality of vehicle identifiers assigned to the vehicle based on the timestamp, wherein the plurality of vehicle identifiers are applicable for assigning at different respective time slots. The approach also involves generating a hashed vehicle identifier by using a hash function on the determined vehicle identifier and the timestamp. The approach also involves reporting the probe point using the hashed vehicle identifier to identify the probe point.

20 Claims, 12 Drawing Sheets

| VEHICLE | VEHICLE IDENTIFIER | PROBE POINT | | | | | |
|---------|--------|--------|--------|--------|--------|--------|--------|
| V1 | A | P1,T1 | | P3,T3 | | P5,T5 | |
|    | B |       | P2,T2 |      | P4,T4 |      | P6,T6 |

(51) Int. Cl.
*H04W 4/44* (2018.01)
*H04L 9/40* (2022.01)

(56) References Cited

U.S. PATENT DOCUMENTS

2019/0140850 A1* 5/2019 Ambrosin ............. H04L 9/0869
2019/0385269 A1* 12/2019 Zachary ................ H04N 7/188

OTHER PUBLICATIONS

Zhou et al., "Privacy Preserving Origin-Destination Flow Measurement in Vehicular Cyber-Physical Systems", Published in: 2013 IEEE 1st International Conference on Cyber-Physical Systems, Networks, and Applications (CPSNA), 2013, pp. 32-37.

Huang et al., "Persistent Traffic Measurement Through Vehicle-to-Infrastructure Communications in Cyber-Physical Road Systems", 2017 IEEE 37th International Conference on Distributed Computing Systems, Aug. 6, 2018, pp. 394-403.

* cited by examiner

FIG. 7A

Vehicle V1

| Vehicle Identifier | Probe Point | | | | | |
|---|---|---|---|---|---|---|
| A | P1,T1 | | P3,T3 | | P5,T5 | |
| B | | P2,T2 | | P4,T4 | | P6,T6 |

FIG. 7B

Vehicle V2

| Vehicle Identifier | Probe Point | | | | | |
|---|---|---|---|---|---|---|
| A | P1,T1 | | | | P5,T5 | |
| B | | P2,T2 | P3,T3 | P4,T4 | | |
| C | | | P3,T3 | | P5,T5 | P7,T7 |

METHOD, APPARATUS, AND SYSTEM FOR ENSURING PRIVACY WHILE MAINTAINING FLOATING CAR DATA ACCURACY

BACKGROUND

Modern location-based services and applications (e.g., autonomous driving) are increasingly demanding highly accurate and detailed digital map data (e.g., centimeter-level accuracy or better) across wide geographic areas. To achieve such levels of coverage, map service providers have relied on data collected from a variety of sources. Floating car data which uses probe data would be an excellent source of data due to the sheer amount of data generated daily. However, probe data is generally regarded to lack the quality required to build a highly accurate and detailed map because of the anonymization that probe data undergoes due to privacy concerns. Accordingly, service providers face significant technical challenges tin maintaining probe data accuracy while ensuring data privacy.

Some Example Embodiments

Therefore, there is a need for an approach for ensuring privacy while maintaining probe data accuracy.

According to one embodiment, a method comprises receiving probe point from a vehicle, wherein the probe point includes a location of the vehicle and a timestamp indicating when the location was determined by a location sensor. The method also comprises determining a vehicle identifier from among a plurality of vehicle identifiers assigned to the vehicle based on the timestamp, wherein the plurality of vehicle identifiers are applicable for assigning at different respective time slots. The method further comprises generating a hashed vehicle identifier by using a hash function on the determined vehicle identifier and the timestamp. The method further comprises reporting the probe point using the hashed vehicle identifier to identify the probe point.

According to another embodiment, an apparatus comprises at least one processor, and at least one memory including computer program code for one or more computer programs, the at least one memory and the computer program code configured to, with the at least one processor, cause, at least in part, the apparatus to receive a probe point from a vehicle, wherein the probe point is paired with a hashed vehicle identifier, and wherein the hashed vehicle identifier was generated using a hash function on a timestamp of the probe point and a vehicle identifier determined among a plurality of vehicle identifiers assigned to the vehicle based on different respective time slots corresponding to the timestamp. The apparatus is also caused to decode the vehicle identifier from the hashed vehicle identifier using the hash function. The apparatus is further caused to aggregate the probe point with one or more other probe points to determine a vehicle path, wherein the one or more other probe points are associated with any of the plurality of vehicle identifiers of the vehicle that have been decoded.

According to another embodiment, a computer-readable storage medium carries one or more sequences of one or more instructions which, when executed by one or more processors, cause, at least in part, an apparatus to receive probe point from a vehicle, wherein the probe point includes a location of the vehicle and a timestamp indicating when the location was determined by a location sensor. The apparatus is also caused to determine a vehicle identifier from among a plurality of vehicle identifiers assigned to the vehicle based on the timestamp, wherein the plurality of vehicle identifiers are applicable for assigning at different respective time slots. The apparatus is further caused to generate a hashed vehicle identifier by using a hash function on the determined vehicle identifier and the timestamp. The apparatus is further caused to report the probe point using the hashed vehicle identifier to identify the probe point.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7B are diagrams of reshuffled probe data from two vehicles, according to one embodiment;

DESCRIPTION OF SOME EMBODIMENTS

Examples of a method, apparatus, and computer program for providing probe data accuracy while ensuring privacy are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
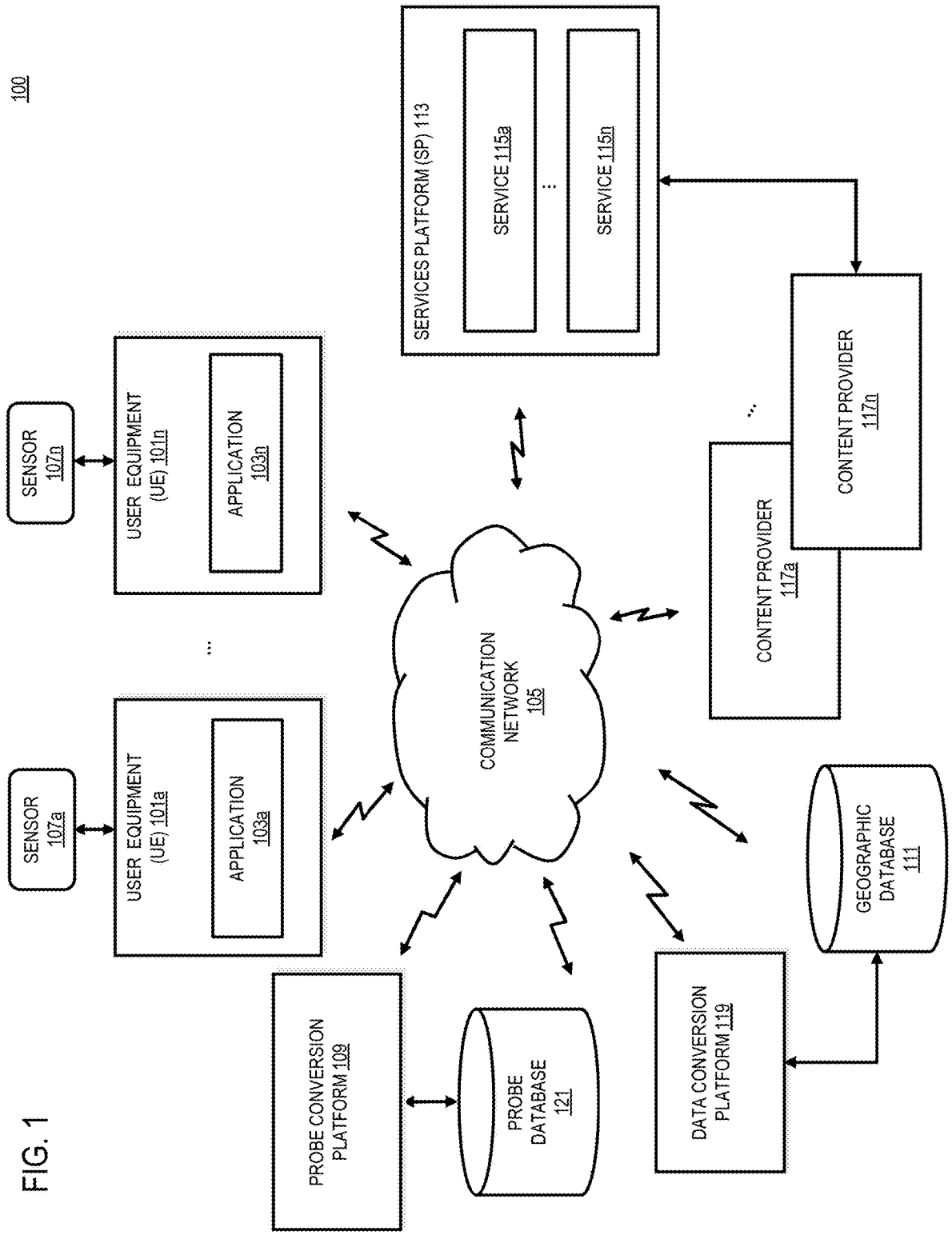
FIG. 1 is a diagram of a system capable of providing probe data accuracy while ensuring privacy, according to one embodiment.

FIG. 1 is a diagram of a system capable of providing probe data accuracy while ensuring privacy, according to one embodiment. Vehicles will soon be making driving decisions without human intervention. In order to support those decisions, autonomous vehicles need reliable map information to assist them in various situations, such as but not limited to knowing road layouts, what obstructions may lay ahead, and updates about local traffic laws. Map information is an important and indispensable source of guidance for autonomous vehicles, so this map information needs to be correct, accurate, and up to date to provide accurate representation of the world or environment in which the vehicle operates.

Map information can be derived from probe data. Probe data is one or more probe points that can be collected from a number of sources including but not limited to sensors onboard vehicles, and/or UEs. For example, consumer vehicles and/or UEs traveling in a road network can collect probe data (e.g., vehicle pose path, trajectory, location, image data, LiDAR data, etc.) about a road segment or the surrounding area. The sensors can store the probe data or transmit the collected data over a communication network. The probe data can be any type of probe data used by a global mapping platform with one example being a global position satellite (GPS) probe data.

Probe data is an ideal tool for generating accurate maps due to the large amount of probe data generated daily. However, probe data is generally regarded to lack the quality required to build a highly accurate and detailed map because of the anonymization the data undergoes due to privacy concerns.

To address this problem, a system 100 of FIG. 1 introduces the capability to provide probe data accuracy while ensuring privacy. The system 100 can collect probe data from sensors onboard vehicles 107a-107n. Although sensors onboard vehicles are described, similar methods of probe data collection may be used such as using UEs. The system 100 can use a probe conversion platform 109 to receive the probe data from the sensors 107a-107n and determine a vehicle identifier from a plurality of vehicle identifiers assigned to the vehicle that collected the probe data. The system 100 can then use the probe conversion platform 109 to generate a hashed vehicle identifier. The system 100 can report the hashed vehicle identifier, which includes the probe data, providing accurate data while ensuring privacy.

Figure 2:
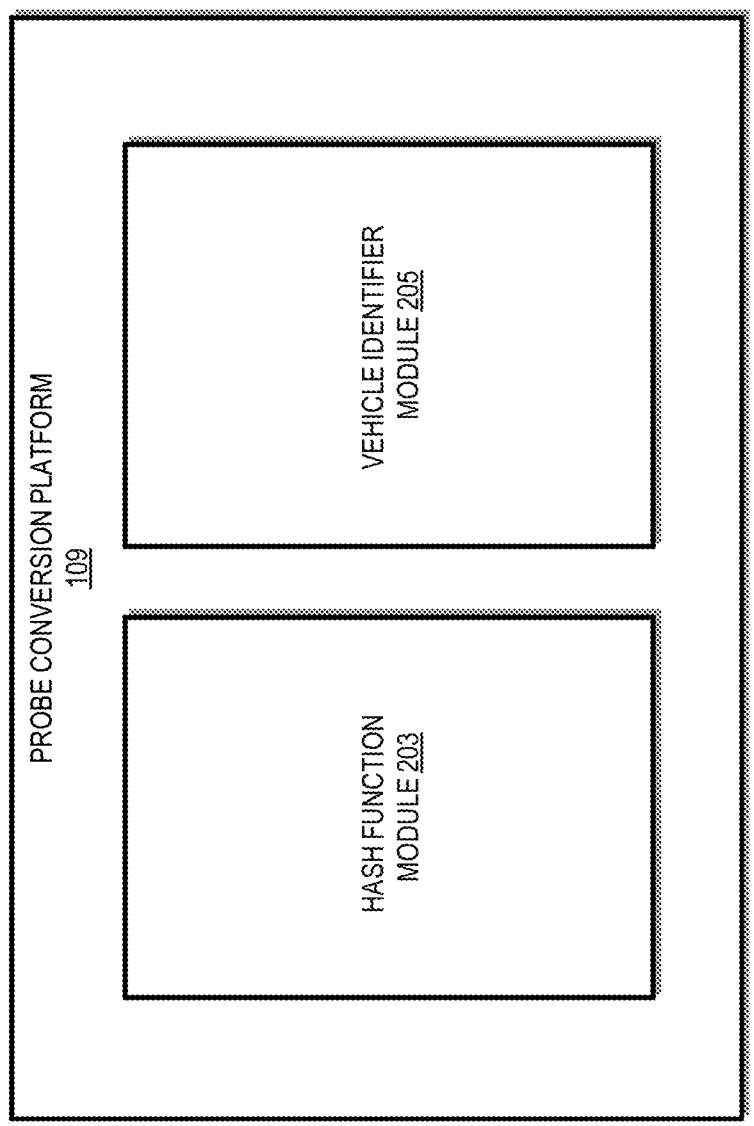
FIG. 2 is a diagram of the components of a probe conversion platform, according to one embodiment.

In one embodiment, as shown in FIG. 2, the probe conversion platform 109 includes one or more components for providing probe data accuracy while ensuring privacy, according to the various embodiments described herein. It is contemplated that the functions of these components may be combined or performed by other components of equivalent functionality. In this embodiment, the probe conversion platform 109 includes a hash function module 203 and a vehicle identifier module 205. The above presented modules and components of the probe conversion platform 109 can be implemented in hardware, firmware, software, or a combination thereof. Although depicted as a single component in FIG. 1, it is contemplated that the probe conversion platform 109 may be implemented as a module of any other component of the system 100 (e.g., a component of the services platform 113, services 115a-115n (also collectively referred to as services 115), UE 101, application 103 executing on the UE 101, etc.). In another embodiment, one or more of the data conversion platform 101 and/or any of the modules 203-205 may be implemented as a cloud-based service, local service, native application, or combination thereof. The map validation, discovery, update, and interface functions of the probe conversion platform 109 and the modules 203-205 are discussed with respect to FIGS. 3-8 below.

Figure 3:
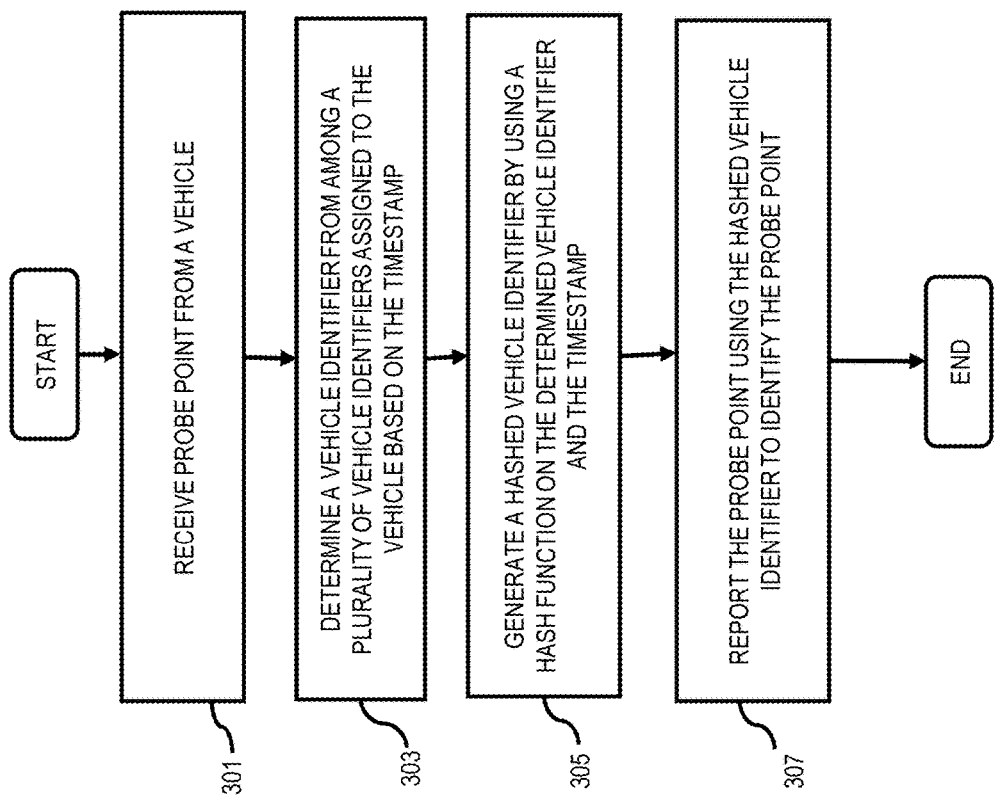
FIG. 3 is a flowchart of a process for providing probe data accuracy while ensuring privacy, according to one embodiment.
Figure 11:
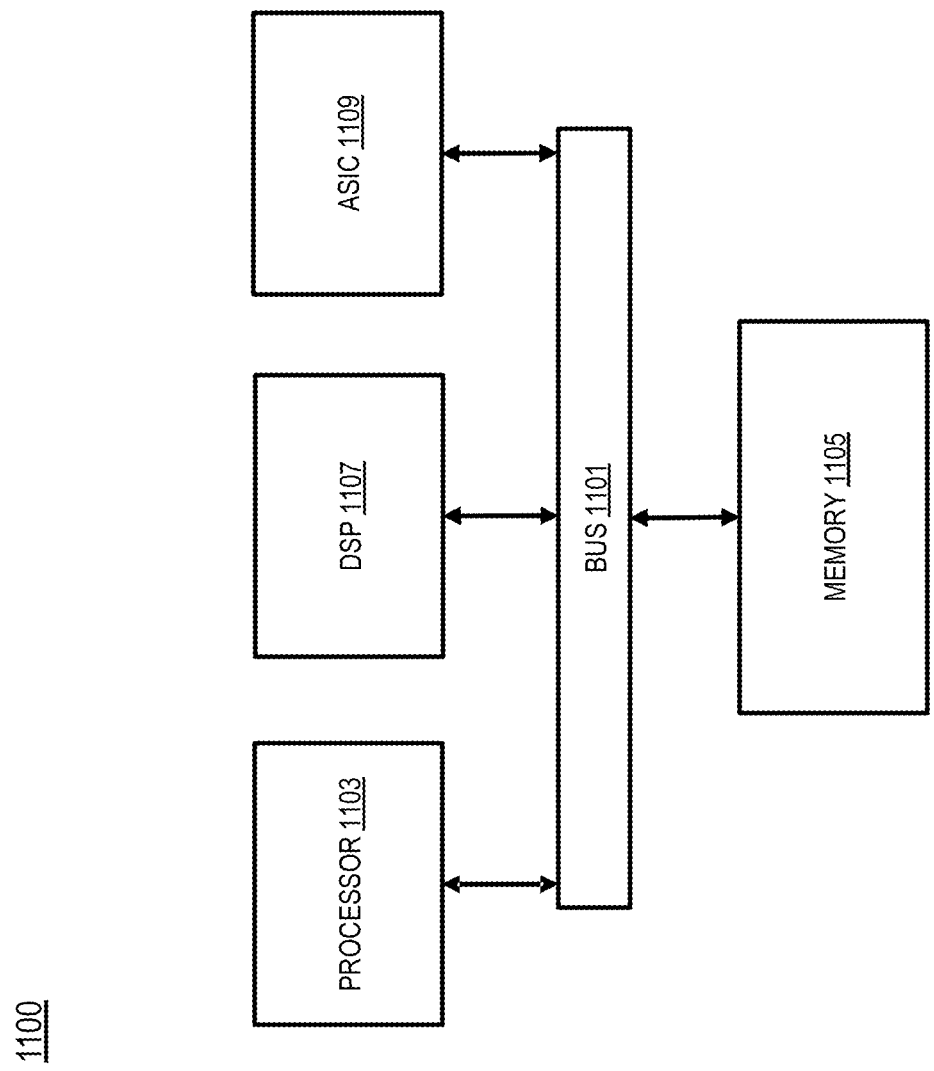
FIG. 11 is a diagram of a chip set that can be used to implement an embodiment of the invention.

FIG. 3 is a flowchart of a process for providing probe data accuracy while ensuring privacy, according to one embodiment. In various embodiments, the probe conversion platform 109 and/or any of the modules 203-205 may perform one or more portions of the process 300 and may be implemented in, for instance, a chip set including a processor and a memory as shown in FIG. 11. As such, the probe conversion platform 109 and/or any of the modules 203-205 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In step 301, the probe conversion platform 109 receives a probe point. The probe point is recorded using a location sensor 107 onboard a vehicle. The probe conversion platform 109 receives the probe point, wherein the probe point includes at least a location of the vehicle and a timestamp indicating when the location was determined by the location sensor 107. The probe point can also encompass, for example, data collected from a GPS associated with vehicles, phones or any associated location tracking technology. A probe point may also encompass mined historical archive data collected over time from various sources including, but not limited to, GPS data. In one embodiment, the probe point may be collected from cellular towers triangulation and Bluetooth devices in addition to or in combination with GPS devices. In one embodiment, the probe point may encompass camera data and survey data.

In step 303, the vehicle identifier module 205 determines a vehicle identifier from among a plurality of vehicle identifiers. As discussed above, each probe point includes at least a location and a timestamp to indicate where and when the probe point was collected. The vehicle that collected the probe point will have a plurality of unique vehicle identifiers for privacy purposes. A vehicle identifier from among the plurality of vehicle identifiers will be assigned to every probe point. To allow for probe data obfuscation, the plurality of vehicle identifiers can be rotated or shuffled for each collected probe point. For example, the vehicle identifier module 205 may receive four consecutive probe points from a vehicle. The first probe point may be assigned to a first vehicle identifier, the second and third probe point may be assigned to a second vehicle identifier, while the fourth and final probe point may be assigned to a third vehicle identifier. The method for rotating or shuffling through different vehicle identifiers is varied and can be done in a random manner. Each vehicle identifier is paired with at least two or more probe points. Pairing each vehicle identifier with at least five probe points is preferable, but any number of probe points may be paired with each vehicle identifier.

In step 305, the hash function module 203 generates a hashed vehicle identifier. The hash function module 203 can use the vehicle identifier associated with the probe point and the timestamp of the probe point to calculate a hashed vehicle identifier.

In step 307, the probe conversion platform 109 reports the probe point using the hashed vehicle identifier.

Figure 4:
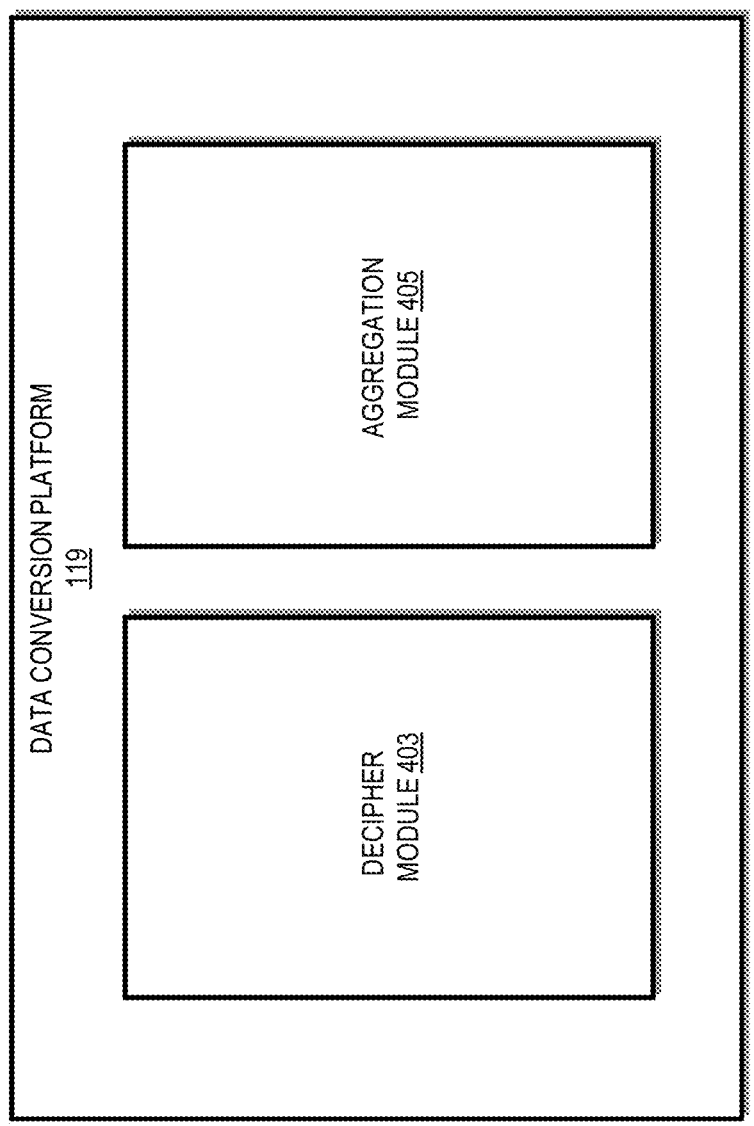
FIG. 4 is a diagram of the components of a data conversion platform, according to one embodiment.

In one embodiment, as shown in FIG. 4, the data conversion platform 119 includes one or more components for providing probe data accuracy while ensuring privacy, according to the various embodiments described herein. It is contemplated that the functions of these components may be combined or performed by other components of equivalent functionality. In this embodiment, the data conversion platform 119 includes a decipher module 403 and an aggregation module 405. The above presented modules and components of the data conversion platform 119 can be implemented in hardware, firmware, software, or a combination thereof. Although depicted as a single component in FIG. 1, it is contemplated that the data conversion platform 119 may be implemented as a module of any other component of the system 100 (e.g., a component of the services platform 113, services 115a-115n (also collectively referred to as services 115), UE 101, application 103 executing on the UE 101, etc.). In another embodiment, one or more of the data conversion platform 119 and/or any of the modules 403-405 may be implemented as a cloud-based service, local service, native application, or combination thereof. The map validation, discovery, update, and interface functions of the data conversion platform 101 and the modules 403-405 are discussed with respect to FIGS. 5-8 below.

Figure 5:
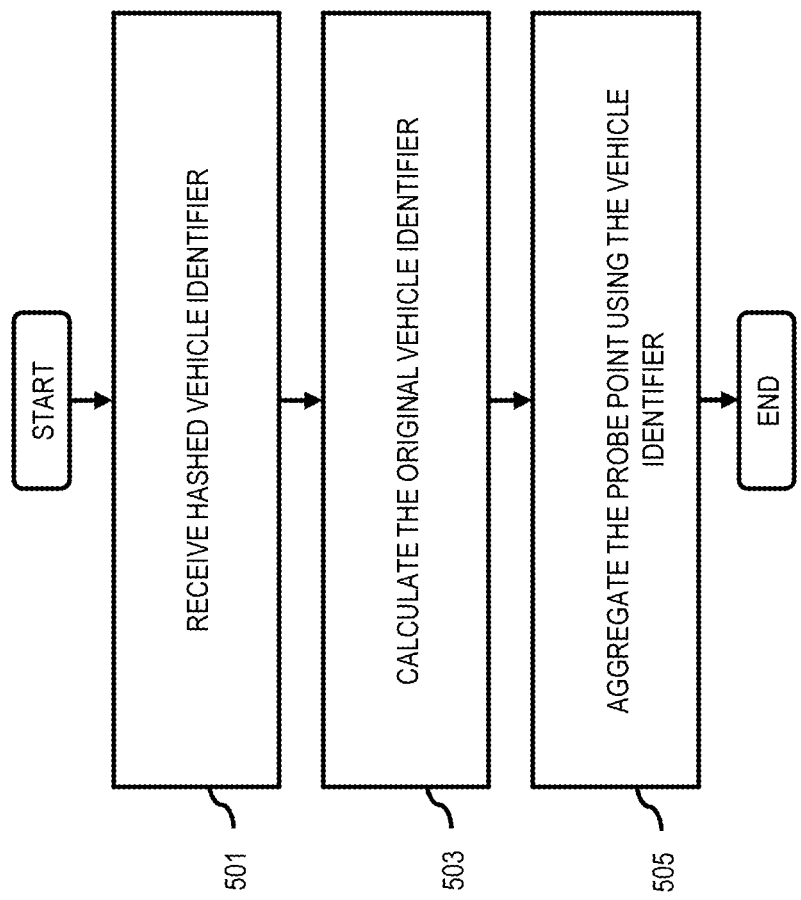
FIG. 5 is a flowchart of a process for aggregating vehicle probe data, according to one embodiment.

FIG. 5 is a flowchart of a process for providing probe data accuracy while ensuring privacy, according to one embodiment. In various embodiments, the data conversion platform 119 and/or any of the modules 403-405 may perform one or more portions of the process 500 and may be implemented in, for instance, a chip set including a processor and a memory as shown in FIG. 11. As such, the data conversion platform 119 and/or any of the modules 403-405 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In step 501, the data conversion platform 119 receives a hashed vehicle identifier. The hashed vehicle identifier contains a probe point and a vehicle identifier. Where the probe point includes at least a location of a vehicle and a timestamp indicating when the location was determined by the location sensor on said vehicle. As discussed above, a vehicle identifier will be assigned to every probe point. To allow for probe data obfuscation, there are a plurality of vehicle identifiers that can be rotated or shuffled for each collected probe point.

In step 503, the decipher module 403 calculates the vehicle identifier using a hash function.

In step 505, the aggregation module 405 aggregates the probe point using the vehicle identifier calculated by the decipher module 403. For example, the aggregation module 405 aggregates the probe point with one or more other probe points that have been decoded that are associated with any of the plurality of vehicle identifiers that have been decoded by the decipher module 403.

Figure 6:
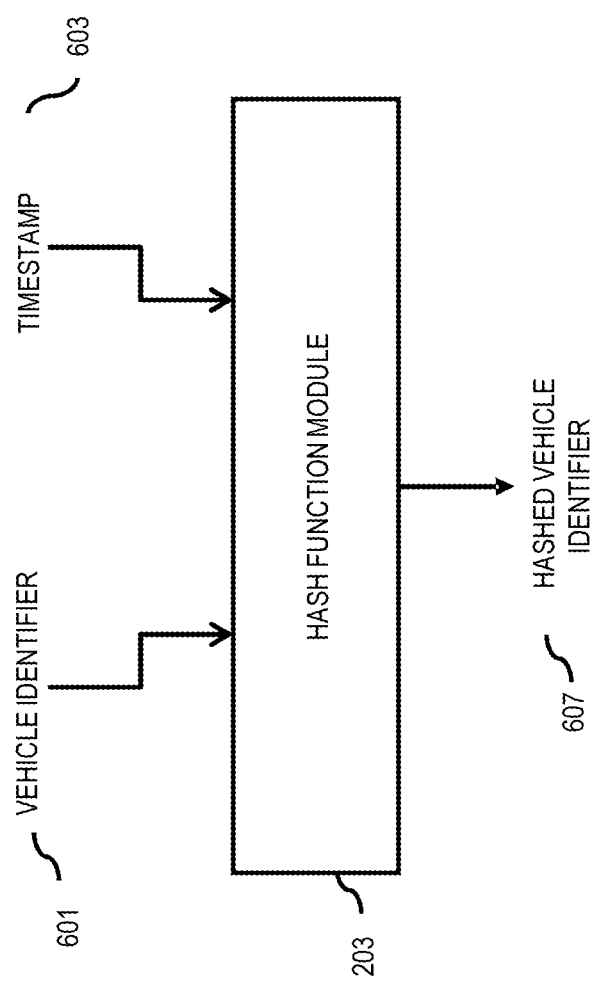
FIG. 6 is a flowchart of a process for using a hash function to calculate a final hashed vehicle identifier, according to one embodiment.

FIG. 6 is a flowchart of a process for using a hash function to calculate a final hashed vehicle identifier. As discussed above, the hash function module 203 generates a final hashed vehicle identifier 607. The hash function module 203 can use the vehicle identifier 601 associated with the probe point and the timestamp 603 of the probe point to calculate a hashed vehicle identifier 607. The timestamp 603 may be determined by the sensor, which recorded the probe point or may be generated by a positing system used by the location sensor. The timestamp may be described in Unix time or any other system for describing a point in time.

FIGS. 7A-7B are diagrams of reshuffled probe data from two vehicles, according to one embodiment. FIG. 7A is a diagram of reshuffled probe diagram for a single vehicle V1. As discussed above the probe conversion platform 109 receives probe points from a vehicle V1. The first probe point has at least a position P1 and a time T1 associated with the position P1. The vehicle V1 that collected the first probe point P1, T1 has two vehicle identifiers A and B. A vehicle identifier can be assigned to every probe point. To allow for probe data obfuscation, the vehicle identifiers A and B can be rotated or shuffled for each collected probe point. The first probe point P1, T1 is assigned to the first vehicle identifier A, while the second probe point P2, T2 is assigned to the second vehicle identifier B. In this example, each consecutive probe point is assigned to a different vehicle identifier than the previously assigned probe point. Although a pattern is shown, in another embodiment the assignment of vehicle identifiers may be random. Next the hash function module 203 can use the vehicle identifier associated with the probe point and the timestamp of the probe point to calculate a hashed vehicle identifier.

FIG. 7B is a diagram of reshuffled probe diagram for a second vehicle V2. As discussed above the probe conversion platform 109 receives probe points from a vehicle V2. The first probe point has at least a position P1 and a time T1 associated with the position. The vehicle V2 that collected the first probe point P1, T1 has three vehicle identifiers A, B and C. A vehicle identifier can be assigned to every probe point. To allow for probe data obfuscation, the vehicle identifiers A, B and C can be rotated or shuffled for each collected probe point. The first probe point P1, T1 is assigned to the first vehicle identifier A, while the second probe point P2, T2 is assigned to the second vehicle identifier B. The third probe point P3, T3 is assigned to both the second vehicle identifier B and the third vehicle identifier C demonstrating that probe points can overlap. Different vehicle identifiers with overlapping probe points allows for accurate reconstruction of vehicle trajectories in the aggregate while protecting privacy. For example, vehicle identifiers with shared probe points limit the ability to determine a specific vehicle's path over long distances. To further protect privacy some probe points may be left out completely. For example, the sixth probe point P6, T6 is not assigned to any vehicle identifier.

Figure 8:
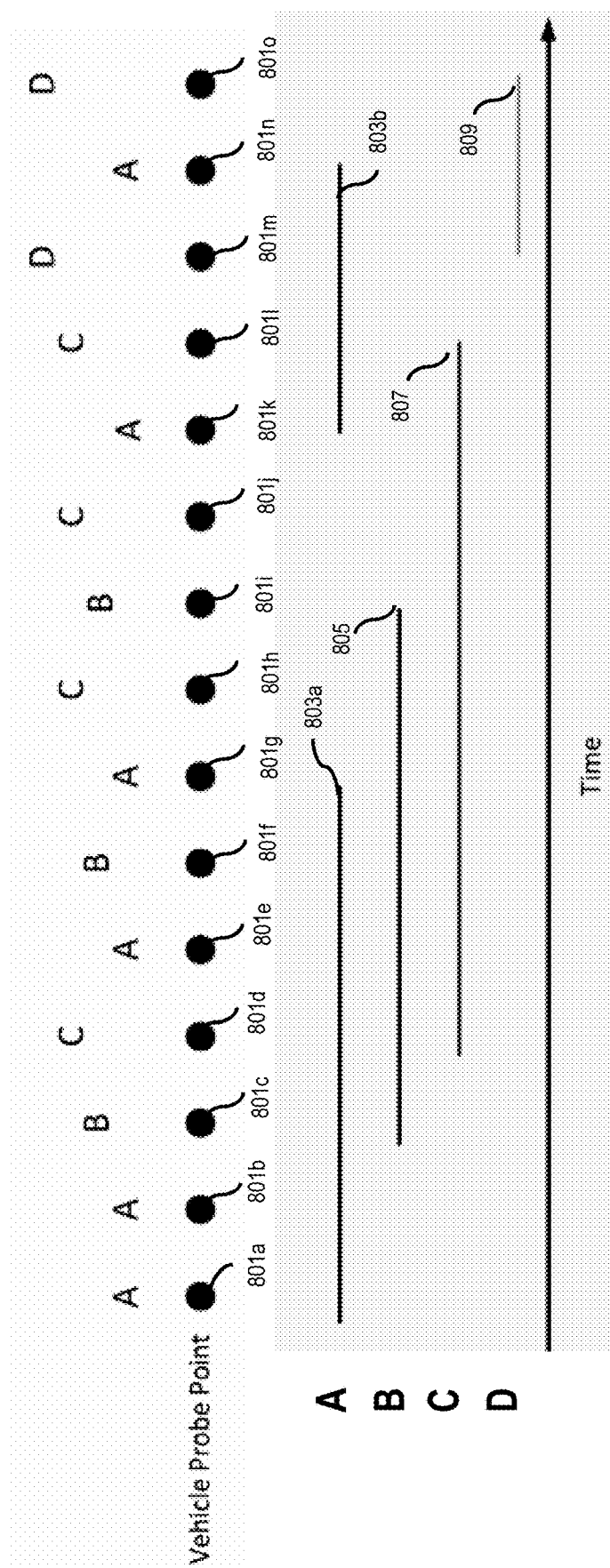
FIG. 8 is a diagram of a single vehicle probe path reassigned to multiple vehicle identifiers, according to one embodiment.

FIG. 8 is a diagram of a single vehicle probe path reassigned to multiple vehicle identifiers. The probe conversion platform 109 receives a number of probe points 801a-801o from a vehicle. Each probe point has at least a position and a time associated with the position. The vehicle that collected the probe points 801a-801o has four vehicle identifiers A, B, C and D. To allow for probe data obfuscation, the vehicle identifiers A, B, C and D can be rotated or shuffled for each collected probe point 801a-801o. For example, the first probe point 801a and second probe point 801b are assigned to the first vehicle identifier A, while the third probe point 801c is assigned to the second vehicle identifier B. A vehicle identifier can be assigned to every probe point.

In this embodiment, the original vehicle path is split among four vehicle identifiers resulting in four smaller vehicle paths 803-809. The different vehicle paths allow for accurate reconstruction of vehicle trajectories in the aggregate while protecting privacy. Each small vehicle path 803-809 corresponds to an individual vehicle identifier. For example, the second vehicle path 805 corresponds to the second vehicle identifier B. The small vehicle paths do not need to be continuous. For example, the vehicle path 803 corresponding to the first vehicle identifier A has a first segment 803a and a second segment 803b. Probe points 801a, 801b, 801e, and 801g correspond to the first segment 803a and probe points 801k and 801n correspond to the second segment 803b. This may be necessary in circumstances when individual probe points are separated be a significant amount of time. For example, probe point 801g and probe point 801k are separated by a length of time that is longer than a determined threshold. The threshold may be implemented to ensure data accuracy. If too much time has passed between two probe points the resulting data (e.g., vehicle pose path, trajectory, location) may be less accurate or useless. In other words, probe points corresponding to a specific vehicle identifier may be grouped according to time to protect data accuracy. Further, as illustrated by the fourth vehicle path 809, at least two probe points must be associated with a vehicle identifier to ensure useful probe data. For example, at least two points are required to determine a vehicles trajectory.

Figure 9:
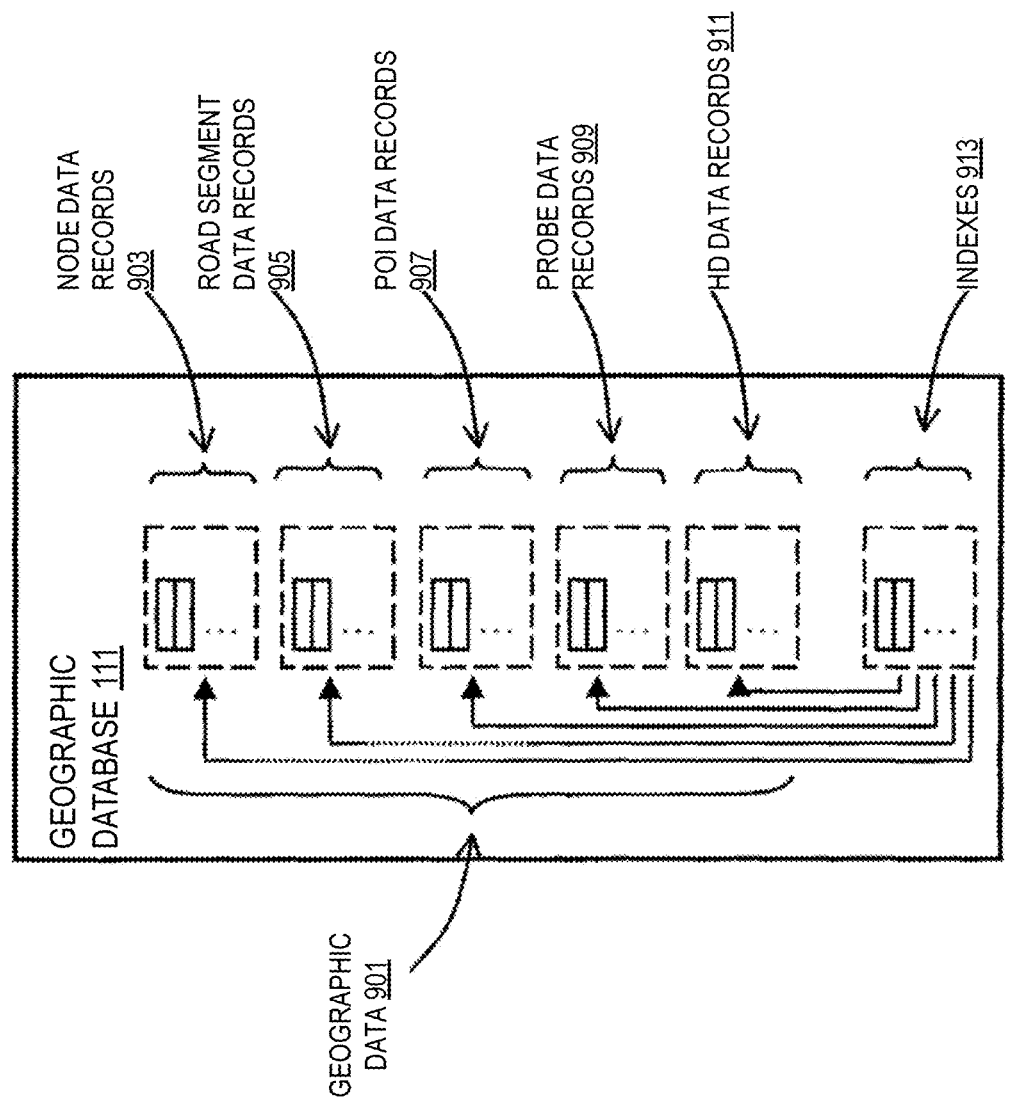
FIG. 9 is a diagram of a geographic database, according to one embodiment.

FIG. 9 is a diagram of a geographic database, according to one embodiment. In one embodiment, the geographic database 111 includes geographic data 901 used for (or configured to be compiled to be used for) mapping and/or navigation-related services, such as for video odometry based on the mapped features (e.g., lane lines, road markings, signs, etc.). In one embodiment, the geographic database 111 includes high resolution or high definition (HD) mapping data that provide centimeter-level or better accuracy of map features. For example, the geographic database 111 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 111 includes node data records 903, road segment or link data records 905, POI data records 907, Vehicle geolocation records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 111. In one embodiment, the indexes 913 may be used to quickly locate data without having to search every row in the geographic database 111 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 907. The geographic database 111 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 111 can also include probe data records 909 for storing the identified feature correspondences (e.g., image-to-image correspondences, image-to-ground correspondences, etc.), camera geometry parameters, location corrected images, location corrected features, location corrected camera models/poses, as well as other related data used or generated according to the various embodiments described herein. By way of example, the probe data records 909 can be associated with one or more of the node records 903, road segment records 905, and/or POI data records 907 to support localization or visual odometry based on the features stored therein and the corresponding estimated quality of the features. In this way, the records 909 can also be associated with or used to classify the characteristics or metadata of the corresponding records 903, 905, and/or 907.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles and other end user devices with near real-time speed without overloading the available resources of the vehicles and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 111 can be maintained by the content provider 117 in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle or UE, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing probe data accuracy while ensuring privacy may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
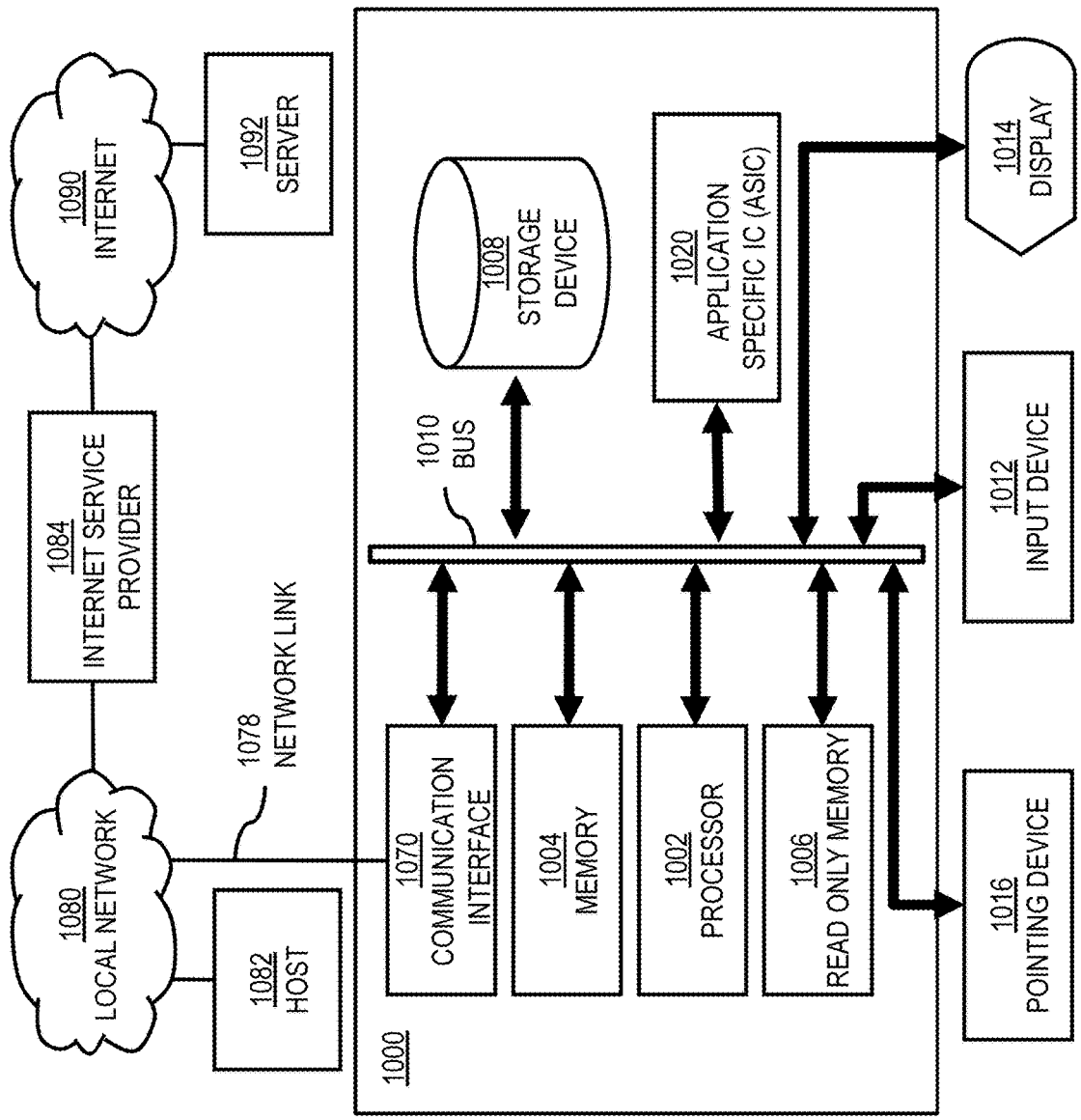
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to provide probe data accuracy while ensuring privacy as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing probe data accuracy while ensuring privacy. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing probe data accuracy while ensuring privacy. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing probe data accuracy while ensuring privacy, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 121 for providing probe data accuracy while ensuring privacy.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set 1100 upon which an embodiment of the invention may be implemented. Chip set 1100 is programmed to provide probe data accuracy while ensuring privacy as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide probe data accuracy while ensuring privacy. The memory 1105 also stores the data associated with or generated by the execution of the inventive steps.

Figure 12:
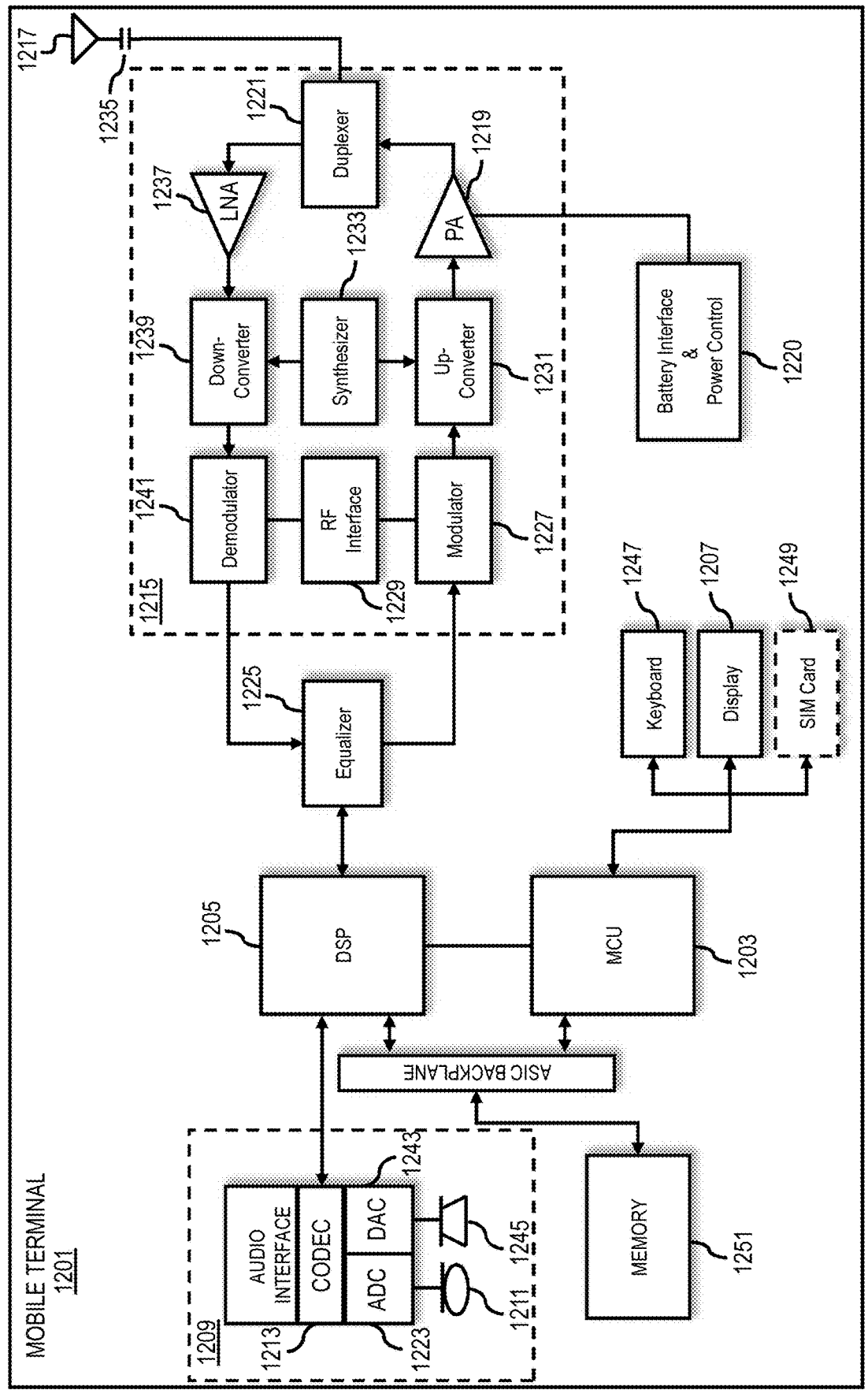
FIG. 12 is a diagram of a mobile terminal (e.g., handset) that can be used to implement an embodiment of the invention.

FIG. 12 is a diagram of exemplary components of a mobile terminal (e.g., vehicle 101, UE 107, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing prob data accuracy while ensuring privacy. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide prob data accuracy while ensuring privacy. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a plurality of probe points from a vehicle, wherein each of the plurality of probe points includes a location of the vehicle and a timestamp indicating when the location was determined by a location sensor;
   determining a vehicle identifier from among a plurality of vehicle identifiers assigned to the vehicle based on the timestamp, wherein the plurality of vehicle identifiers are applicable for assigning at different respective time slots, and wherein the plurality of vehicle identifiers are randomly rotated or shuffled for each of the plurality of probe points from the vehicle;
   generating a hashed vehicle identifier by using a hash function on the determined vehicle identifier and the timestamp;
   decoding the vehicle identifier from the hashed vehicle identifier using the hash function; and
   reporting the probe point using the hashed vehicle identifier to identify the probe point; and wherein the vehicle identifier comprises a randomly assigned character indicative of the probe point associated with a sub-path of an overall vehicle trajectory.

2. The method of claim 1, wherein each vehicle identifier of the plurality of vehicle identifiers is used for assigning to at least two probe points from the vehicle.

3. The method of claim 1, wherein the different respective time slots have a probe reporting time that overlaps between successive time slots of the different respective time slots.

4. The method of claim 1, wherein the different respective time slots have a consistent probe reporting interval for a duration of a probe reporting time corresponding to the different respective time slots.

5. The method of claim 1, wherein the rotation or the shuffling is performed randomly.

6. The method of claim 1, wherein the probe point is reported to a server associated with a service provider, and wherein the server decodes the hashed vehicle identifier using the hash function to determine the vehicle identifier.

7. The method of claim 1, wherein the server aggregates the probe point with one or more other probe points decoded that are associated with any of the plurality of vehicle identifiers that have been decoded by the server.

8. The method of claim 1, wherein the timestamp is generated by a positioning system used by the location sensor.

9. The method of claim 1, wherein the overall vehicle trajectory is broken into sub-paths.

10. An apparatus comprising:
    at least one processor; and
    at least one memory including computer program code for one or more programs, the at least one memory and the computer program code configured to, with the at least one processor, cause the apparatus to perform at least the following:

receive a plurality of probe points from a vehicle, wherein the plurality of probe points are paired with a hashed vehicle identifier, and wherein the hashed vehicle identifier was generated using a hash function on a timestamp of the probe point and a vehicle identifier determined among a plurality of vehicle identifiers assigned to the vehicle based on different respective time slots corresponding to the timestamp, and wherein the plurality of vehicle identifiers are randomly rotated or shuffled for each of the plurality of probe points from the vehicle;

decode the vehicle identifier from the hashed vehicle identifier using the hash function; and aggregate the probe point with one or more other probe points to determine a vehicle path, wherein the one or more other probe points are associated with any of the plurality of vehicle identifiers of the vehicle that have been decoded; and wherein the vehicle identifier comprises a randomly assigned character indicative of the probe point associated with a sub-path of an overall vehicle trajectory.

11. The apparatus of claim 10, wherein the apparatus is further caused to:

provide the probe point, the one or more other probe points, the vehicle path, or a combination thereof as an output for providing a location-based service.

12. The apparatus of claim 11, wherein location-based service includes delivering traffic incident messages, determining traffic flow, generating mapping data, or a combination thereof.

13. The apparatus of claim 10, wherein each vehicle identifier of the plurality of vehicle identifiers is used for assigning to at least two probe points from the vehicle.

14. The apparatus of claim 10, wherein the different respective time slots have a probe reporting time that overlaps between successive time slots of the different respective time slots.

15. The apparatus of claim 10, wherein the different respective time slots have a consistent probe reporting interval for a duration of a probe reporting time corresponding to the different respective time slots.

16. The apparatus of claim 10, wherein the overall vehicle trajectory is broken into sub-paths.

17. A non-transitory computer-readable storage medium carrying one or more sequences of one or more instructions which, when executed by one or more processors, cause an apparatus to perform:

receiving a plurality of probe points from a vehicle, wherein the each of the plurality of probe points includes a location of the vehicle and a timestamp indicating when the location was determined by a location sensor;

determining a vehicle identifier from among a plurality of vehicle identifiers assigned to the vehicle based on the timestamp, wherein the plurality of vehicle identifiers are applicable for assigning at different respective time slots, and wherein the plurality of vehicle identifiers are randomly rotated or shuffled for each of the plurality of probe points from the vehicle;

generating a hashed vehicle identifier by using a hash function on the determined vehicle identifier and the timestamp;

decoding the vehicle identifier from the hashed vehicle identifier using the hash function; and reporting the probe point using the hashed vehicle identifier to identify the probe point; and wherein the vehicle identifier comprises a randomly assigned character indicative of the probe point associated with a sub-path of an overall vehicle trajectory.

18. The non-transitory computer-readable storage medium of claim 17, wherein each vehicle identifier of the plurality of vehicle identifiers is used for assigning to at least two probe points from the vehicle.

19. The non-transitory computer-readable storage medium of claim 17, wherein the different respective time slots have a probe reporting time that overlaps between successive time slots of the different respective time slots.

20. The non-transitory computer-readable storage medium of claim 17, wherein the different respective time slots have a consistent probe reporting interval for a duration of a probe reporting time corresponding to the different respective time slots.

\* \* \* \* \*